United States Patent [19]
Gorriz et al.

[11] Patent Number: 5,166,505
[45] Date of Patent: Nov. 24, 1992

[54] MEASURING PROCESS AND ARRANGEMENT FOR THE THREE-DIMENSIONAL POSITION CONTROL OF THE FOCAL POINT OF HIGH-ENERGY LASER BEAM

[75] Inventors: Michael Gorriz, München; Adolf Giesen, Renningen; Stefan Borik, Leinfelden, all of Fed. Rep. of Germany

[73] Assignee: Messerschmitt-Bölkow-Blohm GmbH, Fed. Rep. of Germany

[21] Appl. No.: 690,270

[22] Filed: Apr. 24, 1991

[30] Foreign Application Priority Data

Apr. 24, 1990 [DE] Fed. Rep. of Germany ....... 4012927

[51] Int. Cl.$^5$ .............................................. G01J 1/20
[52] U.S. Cl. .............................. 250/201.7; 250/206.2; 219/121.78
[58] Field of Search ............... 250/201.2, 201.5, 201.7, 250/206.1, 206.2; 354/406, 407, 408; 356/141, 152; 359/629, 637, 636; 219/121.78, 121.79

[56] References Cited

U.S. PATENT DOCUMENTS

| | | | |
|---|---|---|---|
| 3,296,594 | 1/1967 | Van Heerden | 219/121.78 |
| 4,731,772 | 3/1988 | Lee | 359/19 |
| 4,742,219 | 5/1988 | Ando | 250/201.5 |
| 4,845,352 | 7/1989 | Benschop | 250/201.7 |
| 4,929,823 | 5/1990 | Kato et al. | 250/201.5 |

FOREIGN PATENT DOCUMENTS 3406677 9/1985 Fed. Rep. of Germany.

OTHER PUBLICATIONS

Sensor Review, 10(1) pp. 35-37-Industrial application for optical profilometry, Jan. 1990.
Optical Readout of Viedodisc.-IEEE transactions on consumer electronics, Nov. 1976.

Primary Examiner—David C. Nelms
Assistant Examiner—Que T. Le
Attorney, Agent, or Firm—Evenson, Wands, Edwards, Lenahan & McKeown

[57] ABSTRACT

A process and apparatus for three-dimensional position control of the focal point of a high-energy laser beam by measuring its directional and focal point deviation. A portion of the energy of the laser beam is split off by means of a beam splitter extending over the whole cross-section of the laser beam and is focussed on a quadrant detector by means of an optical system which introduces an astigmatic aberration. The various patterns and pattern positions generated on the quadrant detector as a function of the defocussing and directional deviation are analyzed by means of an electronic system, and corresponding control signals are generated.

8 Claims, 4 Drawing Sheets

QUADRANT DETECTOR

DESIRED POSITION

DEVIATION

FOCUS

DEVIATION AND FOCUS

FIG. 4a
FIG. 4b
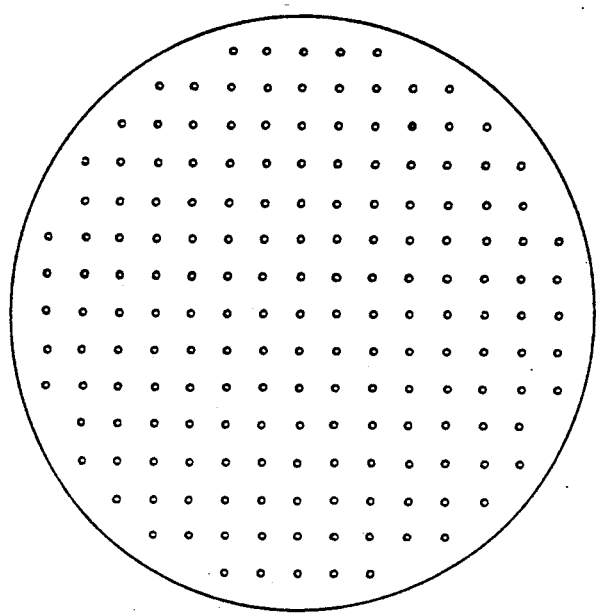

MEASURING PROCESS AND ARRANGEMENT FOR THE THREE-DIMENSIONAL POSITION CONTROL OF THE FOCAL POINT OF HIGH-ENERGY LASER BEAM

BACKGROUND AND SUMMARY OF THE INVENTION

The invention relates to a process and apparatus for three-dimensional position control of the focal point of a high-energy laser, which allows for measurement of directional deviation as well as the focal-distance deviation of the laser beam.

When laser beams are used in processing a material, it is necessary that the beam be positioned and focussed as precisely as possible. Numerous suggestions have been made in order to achieve this purpose. For example, German Patent Document DE 32 02 432 C2 discloses a system which uses a second laser beam and, while monitoring the target, corrects the position in the plane perpendicularly to the beam, but not the depth of the focal point. The same is true for the arrangement according to German Patent Document DE 34 06 677 A1. German Patent Document DE 38 00 427 A1 discloses an arrangement to control the distance of the laser from the workpiece, the focus being determined by means of a detector element consisting of two separate halves.

It is an object of the invention to provide a process and apparatus to determine during the working operation, not only the directional deviation of the beam in a plane perpendicular to the beam axis but also the deviation of the focal point along the beam axis, irrespective of the surface characteristics of the material to be worked, and as a result permit a position control during the working operation.

This and other objects and advantages are achieved according to the invention, in which a beam splitter is utilized to split off a portion of the energy of the laser beam, and such split off portion is then focussed on a quadrant detector by means of an optical system which introduces an astigmatic aberration. The various patterns and pattern positions generated on the quadrant detector are then analyzed in an electronic circuit to generate control signals to control the main laser beam.

Other objects, advantages and novel features of the present invention will become apparent from the following detailed description of the invention when considered in conjunction with the accompanying drawings.

BRIEF DESCRIPTION OF THE DRAWINGS

FIGS. 4a-c are a top view and sectional views of the beam splitter utilized according to the invention.

DETAILED DESCRIPTION OF THE DRAWINGS

Figure 1:
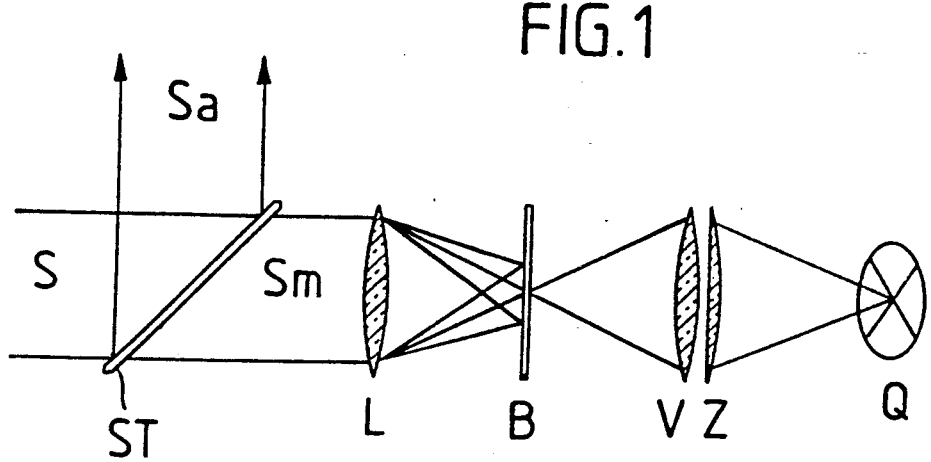
FIG. 1 is a schematic representation of the optical portion of the arrangement according to the invention.

FIG. 1 shows a schematic representation of the optical part of the arrangement according to the invention. It comprises a beam splitter ST, a focussing arrangement L with a diaphragm B as well as a pair of lenses or lens system V/Z, and a quadrant detector Q.

Figure 4C:
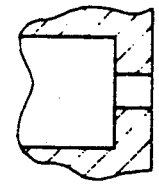

The beam S first impinges on the beam splitter ST and is split by it into a working beam $S_a$ measuring beam $S_m$. The beam splitter is a mirror which is provided with bores as shown in FIG. 4a. The size of the bores is such the ratio between their aggregate area and the overall surface area of the mirror corresponds precisely to the desired transmission factor T of the beam splitter. If a is the diameter, and b is the spacing of the bores, the following is true according to Harvey, J. E., Scott, M. L. (1980), SPIE 240, 232:

$$T = \pi/4 * a^2 / b^2$$

In the transmission, the beams are focussed, and a diffraction pattern is obtained that is determined by the grid effect of the bores. In the reflected beam, most of the energy is concentrated in the zero order with a total of only a few percent being apportioned to the next orders:

$$P_{Rv/\mu} = R(1-T)^2 \, somb^2(aIb*\sqrt{(m^2+n^2)}) * P_0$$

$$P_{Ro/o} = R(1UT)^2 * P_0$$

wherein $P_R$ is the power in the various orders; $P_0$ is the beamed-in total power; and R is the reflection coefficient. In this case, generally $$somb(x) = 2 \, J_1(\pi x)/\pi x$$

and $J1$ = the Bessel function of the 1st order.

In the transmitted beam, there are also many orders, most of the intensity being apportioned to the zero order, but a comparably large amount of intensity being apportioned to the adjacent orders as well.

$$P_{Tv/\mu} = T^2 \, somb^2(aIb * \sqrt{(m^2+n^2)}) * P_0$$

and thus for the zero order $$P_{To/o} = T^2 * P_0^2.$$

Each order by itself is an exact image of the far zone of the original beam. For this reason, a beam diagnosis is possible. It is a disadvantage of this process that a portion of the beam power goes into the higher diffraction orders.

The distance between the bores determines the distance between the diffraction orders, but the radius of the bores determines the coupled-out intensity. These parameters, therefore, must be adapted to the requirements of the particular application. In the case of the arrangement described in the embodiment, a hole separation of 3 mm and a bore diameter of 0.5 mm is used. That results in a transmission coefficient of $T = 2.2 * 10^{-2}$.

Figure 2:
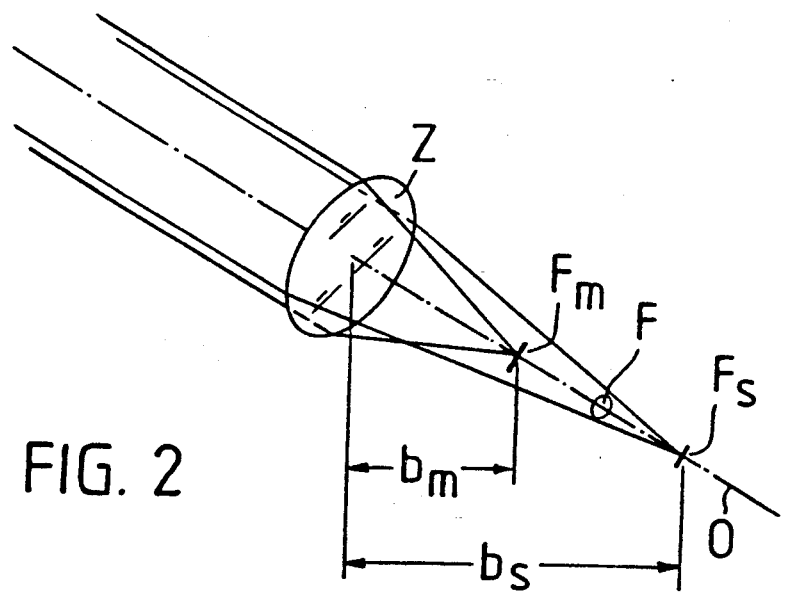
FIG. 2 is a schematic representation of the position of the focal points of the generated astigmatic measuring beam.
Figure 3:
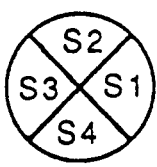
FIG. 3 is a view of the arrangement of the generated focal points on the detector.
Figure 3:
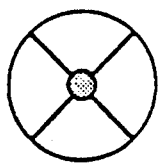
Figure 3:
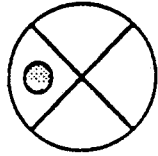
Figure 3:
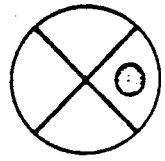
Figure 3:
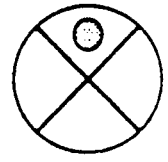
Figure 3:
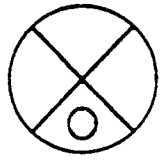
Figure 3:
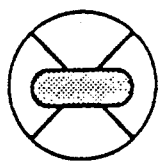
Figure 3:
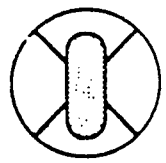
Figure 3:
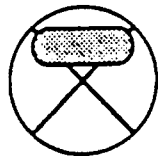
Figure 3:
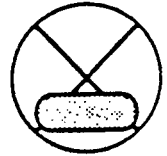
Figure 3:
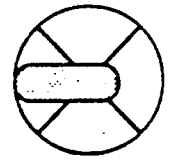
Figure 3:
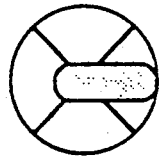

By means of a spherical lens L behind the beam splitter ST, the beam is focussed, and the higher orders are extracted by means of a square pin diaphragm B. By means of the lens combination V/Z that follows, the image is enlarged and an astigmatic aberration is introduced, as described, for example, also in Bricot, C., Lehureau, J. C., Puech, C., Le Carvennec, F. (1976) IEEE Trans. Consumer Electron. CE-22, 304. As a result, as shown in FIG. 2, two different focal points are created in the x-direction and in the y-direction, specifically the meridional focal point $F_m$ and the sagittal focal point $F_s$. The point of the highest sharpness F is situated in-between. There, a quadrant detector Q with four sectors $S_1 \ldots S_4$ is arranged. According to the directional deviation of the beam and the position of the focal point, different images are obtained on the detector, the characteristics of which are illustrated in FIG. 3. The signals at the output of the quadrant detector are called $Q_1 \ldots Q_4$. The correction values for the control mechanism are $K_{Tx}$, $K_{Ty}$, and $K_F$ and are used for adjusting the x-deviation and the y-deviation and the focus. They are calculated as follows:

$$K_{TX} = Q_1 - Q_3$$
$$K_{TY} = Q_2 - Q_4$$
$$K_F = (Q_1 + Q_3) - (Q_2 + Q_4)$$

As indicated in FIG. 3, the directional deviation must first be compensated by means of the corresponding control element before the focal point can be corrected since the focal point correction is based on comparison with a beam that does not deviate directionally.

Figure 5:
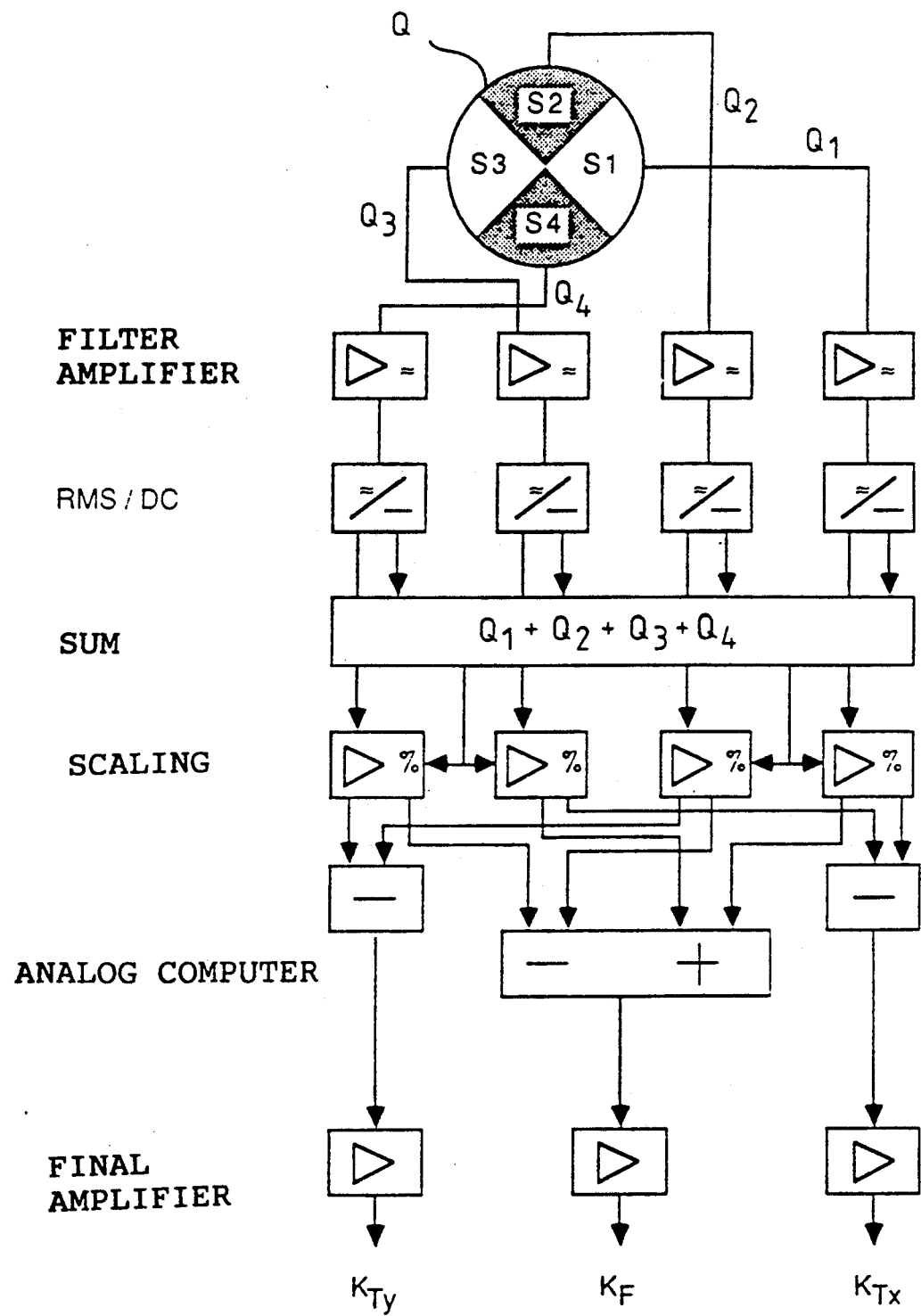
FIG. 5 is a block diagram of the analytical circuit according to the invention.

FIG. 5 illustrates a block diagram of the electronic system used for the analysis of the signals $Q_1 \ldots Q_4$ from the quadrant detector Q with the sectors $S_1 \ldots S_4$, which are individually amplified by means, for example, of operational amplifiers. A band-pass filter follows which is adapted to the frequency of a chopper, which is advantageously interposed into the beam path in the proximity of the diaphragm B (not shown). (The combination of the chopper and the filter amplifier is used to increase the signal-noise ratio, and is required for physical reasons in the case of the pyroelectric detector used in the embodiment.) Subsequently, the signals are converted to a constant-voltage signal by means of voltage-controlled rectifiers (RMS/DC-converters). All signals $Q_1 \ldots Q_4$ are combined by means of an operational amplifier and standardized signals are generated by means of analog dividers.

An analog computer system, also constructed of operational amplifiers, determines the correction values $K_F$, $K_{TX}$, $K_{Ty}$, which are amplified in a final amplification stage. By means of these signals, adaptive optical elements can then be manipulated for the control according to the invention.

In an exemplary embodiment, the system must be able to control a focus variation of up to 2% and a directional deviation of 1.5 mrad. In the case of a focussing lens system with f=125, these are equivalent to ±2 mm of focussing error and 0.22 mm of directional deviation. The beam diameter is to be up to 50 mm.

Because the beam splitter ST must be applied at an angle of 5°, the spacing of the bores in one direction should, in principle, be slightly greater. However, at 5°, the error is less than 1%. (FIG. 4 shows the dimensions). In this case, the diameter of the beam splitter is 55 mm; the distance of the bores from one another is 3 mm; and the diameter of the two-step bores on the input side (depth 9 mm) is 1.5 mm and, on the output side (depth 1 mm), 0.5 mm. The thickness of the beam splitter is 10 mm, and the bores are positioned such that one bore is in the center. The focussing lens L with a focal distance of $f_f$ is arranged as closely as possible behind the beam splitter ST.

The distance of the zero diffraction order from the 1st diffraction order in the focal point amounts to $$c = f * \lambda/b = 1.77 \text{ mm}.$$

The square pin diaphragm B is precisely in the focus, specifically in such a manner that it allows only the zero order to pass through. The inside diameter is 1.6 mm. A directional deviation of 1.5 mrad causes a displacement d of the zero order of $$d = 1.5 \text{ mrad} * 500 \text{ mm} = 0.75 \text{ mm},$$

thus by such a small amount that the zero order is allowed to pass through completely.

The pin diaphragm is now followed by a lens system with a twofold enlargement. The spherical lens V of this system has a focal distance of $f_v = 100$ mm; the cylinder lens Z has a focal distance of $f_z = 1,000$ mm. The lenses V and Z are arranged directly behind one another so that the following formula applies to the calculation:

$$1/f_m = 1/f_v + 1/f_z => f_m = 90.9 \text{ mm}$$
$$f_s = f_v = 100 \text{ mm}$$

where $f_m$ represents the meridional focus and $f_s$ represents the sagittal focus. The mean focus therefore amounts to approximately 95 mm. For an enlargement of two, the object distance g is 142.5 mm, and the mean image distance b is 285 mm. The lens combination V/Z is set up at a distance g from the diaphragm B; the detector Q is set up at a distance b from the lenses V/Z.

When the image of the focal point (thus the object distance) changes because of a focus error, the image distance will also change. $b_m$ and $b_s$ are the meridional and the sagittal image distances.

The following table indicates the values for various object distances g (all data in mm):

| g =   | 142.5 | 152.5 | 132.5 |
|-------|-------|-------|-------|
| $b_m =$ | 251.0 | 225.0 | 289.5 |
| $b_s =$ | 335.3 | 290.5 | 407.7 |

In the case of a variation of the object distance by slightly less than 10 mm, the detector therefore remains between the meridional and the sagittal image. This is necessary in order to obtain a correct control signal.

A pyroelectric quadrant detector with an active surface of ±2 mm in every direction is used as the detector. A 200-Hz. chopper is placed in front of the detector. As described above, this chopper is used for chopping the measuring signal.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A process for three-dimensional position control of the focal point of a high-energy laser beam by measuring both a two-dimensional directional deviation and a focal-distance deviation of the laser beam, comprising the steps of:

splitting off a portion of the energy of said high-energy laser beam by means of a beam splitter which extends over the entire cross section of said beam;

generating an astigmatic aberration in said split off portion by means of optical elements interposed in a path thereof;

focussing said split off portion on a quadrant detector;

by means of an electronic circuit, analyzing patterns and pattern positions generated on said quadrant detector as a function of the two dimensional directional deviation and the focal-distance deviation of said laser beam; and generating three dimensional control signals corresponding to output signals from said electronic circuit.

2. A process according to claim 1, wherein said step of splitting off a portion of the energy of said laser beam is performed by means of a vaporized beam splitter, which contains bores distributed in a grid-shape over the cross-section of the laser beam, wherein a diffraction pattern generated by the grid structure of the bores is focussed on a centered square pin diaphragm, by means of which higher diffraction orders are masked; and wherein a beam passing through the pin diaphragm is focussed on said quadrant detector by means of the optical elements generating an astigmatic aberration.

3. An arrangement for the three-dimensional position control of the focal point of a high-energy laser beam by measuring a two-dimensional directional deviation and a focal-distance deviation, comprising:

a beam splitter extending over an entire cross-section of said laser beam, by means of which a portion of the energy of said laser beam is split off, an optical system which generates an astigmatic aberration in said split off portion and focusses said split off portion on a quadrant detector, and electronic means responsive to output signals from said quadrant detector for generating three-dimensional position control signals, as a function of the two-dimensional directional deviation and the focal-distance deviation of said laser beam.

4. An arrangement according to claim 3, wherein the beam splitter is a vaporized plate which contains bores distributed in the manner of a grid over the cross-section of the laser beam.

5. An arrangement according to claim 4, which further comprises a centered square pin diaphragm for selection of a zero diffraction order from higher diffraction orders.

6. An arrangement according to claim 3, wherein said optical system comprises a spherical lens, and a cylinder lens which has a focal distance approximately ten times that of the spherical lens.

7. An arrangement according to claim 4, wherein said optical system comprises a spherical lens, and a cylinder lens which has a focal distance approximately ten times that of the spherical lens.

8. An arrangement according to claim 5, wherein said optical system comprises a spherical lens, and a cylinder lens which has a focal distance approximately ten times that of the spherical lens.

* * * * *